Feb. 6, 1923.
R. H. BUTLER.
SPOTLIGHT MOUNTING FOR AUTOMOBILES.
FILED NOV. 9, 1920.
1,444,304
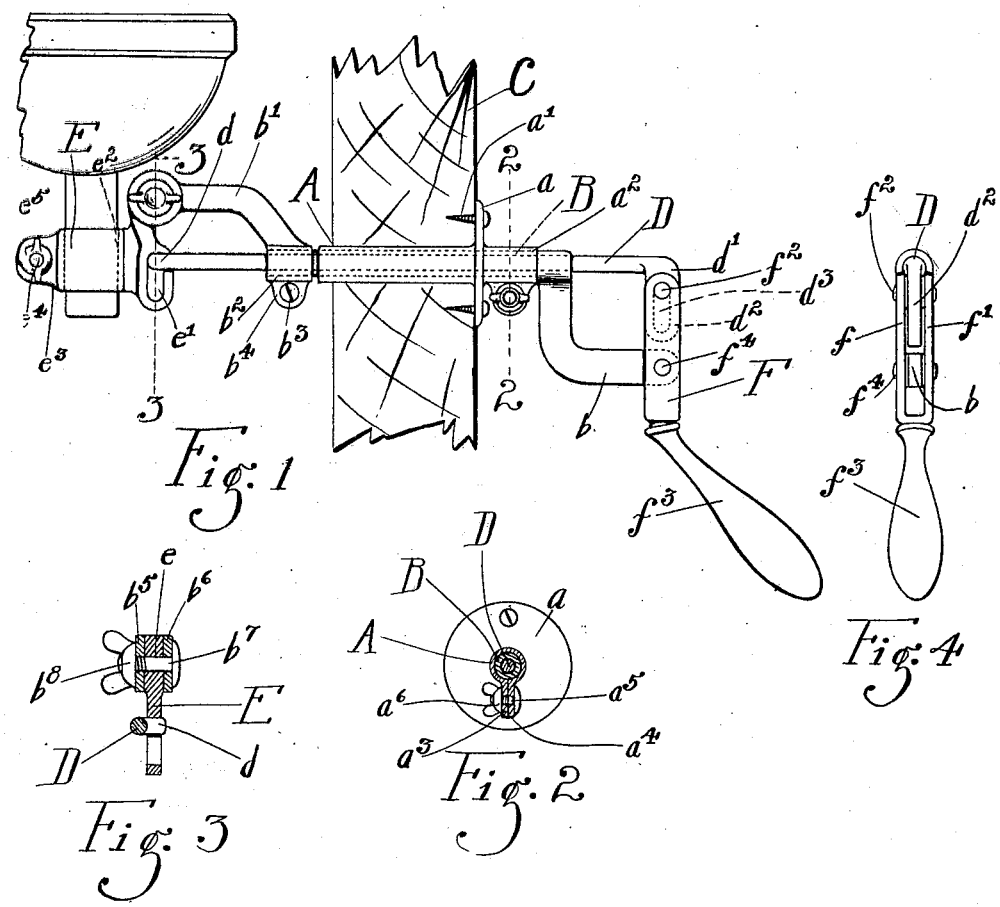
Inventor
Robert H. Butler
By Walter F. Murray
Attorney Patented Feb. 6, 1923.

1,444,304

UNITED STATES PATENT OFFICE.

ROBERT H. BUTLER, OF CINCINNATI, OHIO, ASSIGNOR TO HENRY W. MEYER, OF CINCINNATI, OHIO.

SPOTLIGHT MOUNTING FOR AUTOMOBILES.

Application filed November 9, 1920. Serial No. 422,944.

*To all whom it may concern:*

Be it known that I, ROBERT H. BUTLER, a citizen of the United States of America, and resident of Cincinnati, in the county of Hamilton and State of Ohio, have invented a new and useful Improvement in Spotlight Mountings for Automobiles, of which the following is a specification.

An object of my invention is to provide a spotlight mounting means that is especially adapted for closed cars of the coupé type.

Another object of my invention is to provide a device of the kind referred to, having a minimum of parts, and that will permit manipulation of the spotlight from the interior of the automobile.

These and other objects are attained by the means described herein and disclosed in the accompanying drawing in which:—

Fig. 1 is a plan view of a device embodying my invention mounted upon an automobile section.

Fig. 2 is a sectional view on line 2—2 of Fig. 1.

Fig. 3 is a sectional view on line 3—3 of Fig. 1.

Fig. 4 is an end view of the device shown in Fig. 1.

My invention comprises a sleeve A adapted to extend thru a coupé frame C. Extending thru the sleeve A are the hollow shaft B and the rod D. The shaft B is adapted to pivotally support a spotlight exteriorly of the automobile. The rod D is adapted to manipulate the spotlight about the pivotal mounting on the shaft B.

The hollow sleeve A extends thru the coupé frame C and is fixedly attached thereto by means of the flange $a$ formed thereon and thru which the fastening means, such as the screws $a'$, extend. The flange $a$ is preferably mounted on the interior of the frame C. Formed on the sleeve A and extending inwardly of the machine beyond the flange $a$ is a split collar $a^2$. The split collar has the perforated flanges $a^3$ and $a^4$ formed thereon, and thru the perforations extends a bolt $a^5$, the head of which is adapted to lie upon the flange $a^4$, and upon the threaded end of which is mounted a winged nut $a^6$ adapted to lie upon the flange $a^3$. Extending thru the sleeve A and thru the split collar $a^2$ formed thereon, is the holow shaft B. An arm $b$ is formed on the shaft B interiorly of the automobile. Mounted upon the exterior of the shaft B is the bracket $b'$. The bracket may be mounted upon the shaft B by any suitable means such as the split bearing $b^2$ extending about the shaft B, and secured upon the shaft B by means of a screw $b^3$ extending thru flanges $b^4$ formed on the split bearing $b^2$. Pivotally mounted upon the bracket $b'$ is the spotlight support E. The support E may be mounted in any suitable manner, for example, the perforated branches $b^5$ and $b^6$ formed on the end of the bracket $b'$, and between which branches the support E may be mounted by means of the bolt $b^7$ extending thru the perforations in the branches $b^5$ and $b^6$ and thru the perforation $e$ in the support, and upon one end of which the winged nut $b^8$ is mounted, whereby the branches may be drawn upon the support E. The support E has an elongated slot $e'$ formed therein. A spotlight may be mounted upon the support E by any suitable means such as having a slot $e^2$ in the support E in which a spotlight standard may be mounted. The spotlight standard may be secured in the slot $e^2$ by forming a split bearing, and having the perforated flanges $e^3$ formed thereon. The flanges $e^3$ are drawn upon one another by means of a bolt $e^4$ and winged nut $e^5$, in the manner singular to which the bolt $a^5$ and the winged nut $a^6$ are employed to draw the flanges $a^3$ and $a^4$ of the collar $a^2$, upon one another. Extending thru the hollow shaft B is the rod D. The exterior end $d$ of the rod D is preferably L shaped and extends thru the slot $e'$ in the support E. The interior end $d'$ of the rod D has a slotted shoulder $d^2$ formed thereon.

The U shaped lever arm F is pivotally mounted upon the arm $b$ and contains between its arms $f$ and $f'$ the slotted shoulder $d^2$ on the rod D. A pin $f^2$ extending between the arms $f$ and $f'$ passes thru the slot $d^3$ in the shoulder $d^2$. A handle $f^3$ is formed on the lever arm F.

The operation of my device is as follows:—

The sleeve A is fixedly mounted on the coupé frame C, extending therethru. The hollow shaft B is rotatably mounted within the sleeve A. The rod D can be longitudinally reciprocated thru the hollow shaft B. These movements of shaft B and rod D are controlled by the handle $f^3$ mounted on the lever arm F. If the rays of the spotlight are to be directed from side to side the handle $f^3$ is moved about the pivot $f^4$ connecting the arm $b$ and the lever arms $f$ and $f'$ thereby reciprocating the rod D thru the hollow shaft and moving the support E about its pivotal connection $b^7$ with the bracket $b'$. The elongated slots $e'$ in the support E and $d^3$ in the shoulder $d^2$, permit the ready reciprocation of the rod D without bending it, because of its contact with the support E and the lever arm F. If it is desired to direct the rays of the spotlight upward or downward the handle $f^3$ is moved upward or downward thereby turning the rod D and the hollow shaft B in the sleeve A. The winged nuts $a^6$ and $b^8$ permit sufficient pressure to be exerted upon the shaft B and support E so that the spotlight will retain its adjusted position.

What I claim is:—

1. The combination of a sleeve adapted to be mounted upon and to extend from the interior to the exterior of an automobile frame, a hollow shaft rotatably mounted in the sleeve and extending therethru, a bracket and an arm mounted upon the shaft on opposite sides of the sleeve, a spotlight support having an elongated slot mounted pivotally upon the bracket, a lever mounted pivotally upon the arm, a rod extending thru the shaft, a shoulder having an elongated slot therein formed on one end of the rod, a bent end formed on the other end of the rod, the bent end of the rod engaging in the slot on the spotlight support, and a pin mounted on the lever and extending thru the slot in the shoulder on the rod.

2. The combination of an automobile spotlight, an automobile frame having a slot therethrough, a sleeve adapted to be mounted upon the automobile frame and having a bore in alignment with the slot in the frame, a hollow shaft rotatably mounted in the sleeve and extending therethrough, a bracket and an arm mounted on opposite ends of the shaft, a spotlight pivotally mounted on the bracket, a lever pivotally mounted on the arm, a rod extending slidably through the shaft and having a sliding pivotal connection at its opposite ends upon the spotlight and the lever.

3. The combination of an automobile spotlight, an automobile frame having a slot therethrough, a sleeve adapted to be mounted upon the automobile frame and having a bore in alignment with the slot in the frame, a hollow shaft rotatably mounted in the sleeve and extending therethrough, a bracket mounted upon the shaft at one end thereof, a spotlight support upon which the spotlight is mounted, a pivot connecting the spotlight support and the bracket, an arm mounted upon the shaft at the other end thereof, a lever, a pivot connecting the arm and the lever, and a longitudinally reciprocating rod extending through the shaft and having a sliding pivotal connection upon the spotlight support and the lever.

4. The combination of a vehicle body having a slot extending therethrough, a sleeve adapted to be mounted on the body having a bore in alignment with the slot in the body, a tube shaft revolubly mounted in the bore in the sleeve, a spotlight support pivotally mounted on the tube shaft, a rod extending slidably through the tube shaft, a pivot slidably and rotatably connecting the one end of the rod and the spotlight support, a lever arm, a pivot slidably and rotatably connecting the lever arm and the other end of the rod, and a pivot connecting the lever arm and the tube shaft.

In testimony whereof, I have hereunto subscribed my name this 29th day of October, 1920.

ROBERT H. BUTLER.